United States Patent [19]

Boneh et al.

[11] Patent Number: 6,134,660
[45] Date of Patent: Oct. 17, 2000

[54] METHOD FOR REVOKING COMPUTER BACKUP FILES USING CRYPTOGRAPHIC TECHNIQUES

[75] Inventors: Dan Boneh, Chatham; Richard J. Lipton, Lawrenceville, both of N.J.

[73] Assignee: Telcordia Technologies, Inc., Morristown, N.J.

[21] Appl. No.: 08/885,403

[22] Filed: Jun. 30, 1997

[51] Int. Cl.[7] .................................................. H04L 9/00
[52] U.S. Cl. ........................ 713/193; 380/201; 380/277; 380/278; 713/189; 713/200
[58] Field of Search .............. 380/4, 9, 21, 23, 380/25, 30, 49, 50, 59, 200, 201, 255, 277–287; 395/186; 713/150, 189, 193, 194, 200, 201, 202

[56] References Cited

U.S. PATENT DOCUMENTS

| | | | |
|---|---|---|---|
| 4,319,079 | 3/1982 | Best | 380/4 |
| 4,465,901 | 8/1984 | Best | 380/4 |
| 5,008,936 | 4/1991 | Hamilton et al. | 380/50 |
| 5,646,993 | 7/1997 | Aizawa | 380/4 |
| 5,659,614 | 8/1997 | Bailey, III | 380/4 |
| 5,719,938 | 2/1998 | Haas et al. | 380/21 |
| 5,748,735 | 5/1998 | Ganesan | 380/21 |
| 5,802,175 | 9/1998 | Kara | 380/21 |

OTHER PUBLICATIONS

"The Messy Business of Culling Company Files," Wall Street Journal, pp. B1–B2, May 22, 1997.

Blaze, M., "Key Management in an Encrypting File System," 1994.

Blase, M., "A Cryptographic File System for Unix," undated.

*Primary Examiner*—Bernarr E. Gregory
*Attorney, Agent, or Firm*—Joseph Giordano

[57] ABSTRACT

A system enables a user to remove a file from a file system and from all backup tapes without ever mounting a single tape. When a file is backed up, it is first encrypted using a randomly generated key and then backed up. When the user wishes to remove the file from the backup tape, the key used to encrypt the file is deleted. Deleting the encryption key renders the data on the tape inaccessible. No one, including the file owner, can ever access the file again. The encrypt before-backup method is completely transparent to the user. Only the computer system's operating system knows which key was used to encrypt the file during backup. This ensures that when the operating system is instructed to delete the encryption key, the key is "lost" forever and thus the backed up files become unreadable. Unlike prior cryptographic file systems, the revoked backup files are inaccessible to both the user and others.

10 Claims, 5 Drawing Sheets

METHOD FOR REVOKING COMPUTER BACKUP FILES USING CRYPTOGRAPHIC TECHNIQUES

BACKGROUND OF THE INVENTION

1. Field of the Invention

The present invention relates to computer systems and, more particularly, to a method for revoking computer backup files using cryptographic techniques.

2. Discussion of Related Art

Figure 1:
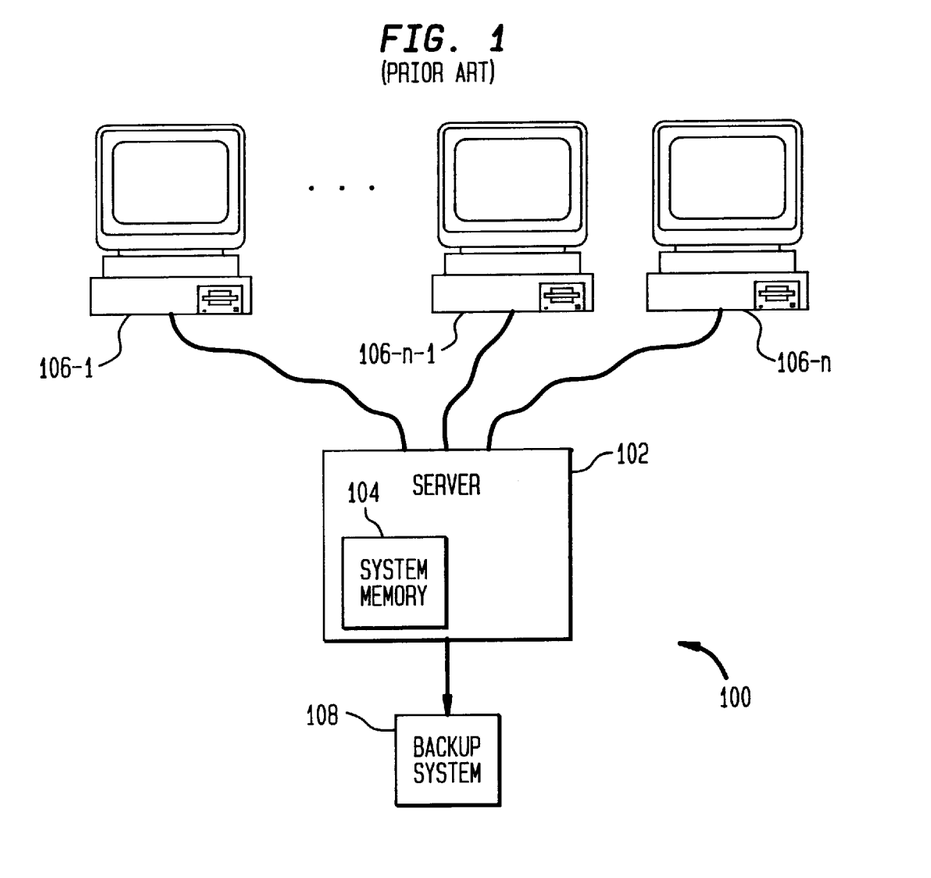
FIG. 1 illustrates a typical local area network.

Many computer systems, such as local area networks (or LANs), have a central file system for multiple users. FIG. 1 illustrates a typical LAN 100. The LAN 100 comprises a central file server 102 which includes a system memory 104. This system memory 104 is a central file system for a number of terminals 106-1–106-n. These terminals transmit data to and receive data from the server 102. To prevent a catastrophic loss of stored information if, for example, the system memory 104 crashes, computer systems often make a backup copy of all files existing at a particular time. For example, once a week or once a month a computer system may make a backup copy of some or all files existing at that time. The backups are performed by the central file server 102 and a backup system 108. These backups may be kept separately from the central file storage system, such as on magnetic tape. Backups may be made onto any suitable memory device or medium, but are herein described as being made on tape. The backup tape may then be stored forever, sometimes off site.

This backup policy enables users to restore an entire central file system to particular points in time from the past. Files on the backup tape may be accessed provided the backup tape is not erased or discarded. Accessing these files may require retrieving one or more backup tapes (often from off site storage), physically mounting the tape or tapes onto a tape drive, locating the desired file on the tape or tapes, and copying the file from the appropriate tape.

It is often desirable to erase all copies of particular files, such as sensitive, confidential, or out-of-date information. For example, many institutions have a document retention program in which after a certain time period (such as three years) certain classifications of documents are retained and all other documents (both hard and electronic copies) are destroyed. Other examples of situations where deleting an entire file, including the backup, is desirable include a patient removing medical files from a hospital's computer system upon checkout, removing financial data which should be erased after a short period of time, or government agencies desiring to delete sensitive data for security purposes.

On many computer systems the "remove-file" command instructing the computer system to delete a file misleads the user into thinking that the file is entirely removed. If the file was copied onto a backup, however, the file is still available, provided that the backup tape has not been erased or discarded. This file availability is an important feature used to protect against accidental file erasure or system crashes and is a primary reason file systems are backed up. The ability to delete backup files is important for users of UNIX operating systems. Standard UNIX operating system backup utilities, e.g., dump and tar, do not enable a user to specify a collection of files that should not be backed up. A user, however, may not be able to completely remove files.

In an article entitled "The Messy Business of Culling Company Files," *Wall Street Journal*, pp. B1–B2, May 22, 1997, the importance of purging old files is discussed. The article notes, for example, that "a perfectly innocent document . . . in the hands of a skilled attorney . . . can be made to look sinister." Also, a user may wish to remove the history and cache files of his web browser. *The Wall Street Journal* article notes, for example, that offensive jokes found on company computers were submitted as evidence in discrimination lawsuits against certain companies. This article, however, does not address the problem of purging backup tapes. Thus, if documents are backed up, they may still be obtained by an adversary, such as opposing counsel in a litigation.

A naive solution to this problem is simply to erase the data from the file system and then remove the file from any backup tape on which it may be found. This may require mounting backup tapes one by one (which files may be located off site), locate the file on each tape, and erase the data from each tape. Note that if a particular file was stored on the file system for a year, it may have been backed up many times (such as 12, 52, or 365 times).

This naive method is impractical for at least two reasons. First, the method is inconvenient to the user. The user typically calls a computer operator or network supervisor whenever such an erasure is to take place. The computer operator may have to retrieve many tapes from storage (which may be off site) and then mount each tape onto a tape drive, search each tape, and erase the relevant portions. Second, this naive approach is likely to fail. The computer operator may have to remove the data from many backup tapes. Not only is this procedure painstaking as described above, it is also insecure because the operator is not infallible and may inadvertently neglect to remove the data from one or more of the old backup tapes or inadvertently erase information intended to be saved.

Cryptographic file systems are known. One such system is described by M. Blaze, "A Cryptographic File System for Unix", available at http://www.cert-kr.or.kr/doc/Crypto-File-System.ps.asc.html. This document is incorporated herein by reference. In a cryptographic file system, files are stored on the system memory in an encrypted form using an encryption function (such as DES, IDEA, or FEAL) E which uses a secret key K. A clear text message M may be encrypted into a ciphertext message C using an encryption function and secret key $E_K$. Thus, $E_K(M)=C$. The cipher text message C may be decrypted back to the plaintext message M using a decryption function D, which also uses the secret key K. Thus, $D_K(C)=M$.

In the cryptographic file system, whenever a file stored on the file system is to be accessed, it is decrypted on the fly using the owner's decryption key. The backup tape is a direct dump of the file system, i.e., the tape contains the encrypted version of every file. Persons having access to the decryption key to decrypt the file on the file system may also access the backed up version of the file. Typically, only the file owner has access to the decryption key. As long as the backup tape exists and the file owner has the decryption key, the file remains on the backup tape in encrypted form. This arrangement does not guarantee that backed up files are inaccessible to other parties. For example, the owner might be forced to reveal his decryption key, e.g., due to a court order. Thus, the cryptographic file system does not guarantee that data on the backup tape desired to be disposed of cannot be accessed.

Therefore, it is an object of the present invention to provide a method for revoking backup files in a manner in which the revoked files are inaccessible to anyone.

It is another object of the present invention to provide a method for revoking backup files without having to physically mount and search backup tapes.

It is a further object of the present invention to provide an infallible, automated method for revoking backup files.

SUMMARY OF THE INVENTION

These and other objects of the present invention are provided by a device and method for revoking back up copies of a file of electronic information from all backup tapes without ever mounting a single tape. The preferred method is performed in the following manner. First, using an encryption key, the electronic information is encrypted. The encrypted electronic information is then backed up, such as by being stored on a backup medium. When the backed up information is to be revoked (either by the user's request or after a predetermined time has elapsed), the key used to encrypt the file is "lost", e.g., erased or deleted. "Losing" the encryption key renders the backed up encrypted electronic information inaccessible. No one, including the file owner, can ever access the electronic information again. Preferably, only the computer system's operating system knows the key used to encrypt the file during backup. This ensures that when the operating system is instructed to delete the encryption key, the key is "lost" forever and thus the backed up files become unreadable. Unlike prior cryptographic file systems, the revoked backup files are inaccessible to both the user and others. Also, the encrypt-before-backup method according to the present invention is preferably completely transparent to the user.

In a preferred embodiment, the inventive device has a system memory, an encryption device, and a backup system. The system memory includes a file system having files of electronic information and a key file of encryption keys. Each file on the file system to be encrypted on the backup system has a list a keys associated with it: a current encryption key and a number of expired encryption keys which were used to encrypt previous backups of the same file. Preferably, the encryption key is known only to the system and is not revealed to the user. The encrypted file is stored on a backup tape. In a preferred embodiment, a current key has a predetermined life time, such as one month. When the life time is exceeded, the key becomes expired and is stored in the key file. The key file preferably stores a predetermined number of expired keys. After the predetermined number is exceeded, the chronologically oldest (or least recently used) key is "lost". The electronic information encrypted with the lost key is revoked—that is, has become inaccessible. The life time of a key may be set to infinity, thus it may never expire.

The key file is preferably also backed up. To prevent the backed up key file from becoming accessible, it is preferably encrypted with a master key. This master key is preferably stored off of the computer system and associated backup tapes. It is also preferable that a new master key is generated every time a backup is performed. When the key file is backed up, both the encryption key and master key should be "lost" to revoke the backed up, encrypted electronic information.

BRIEF DESCRIPTION OF THE DRAWINGS

The present invention is described with reference to the following figures.

DETAILED DESCRIPTION OF PREFERRED EMBODIMENTS

Overview of the Invention

Figure 2:
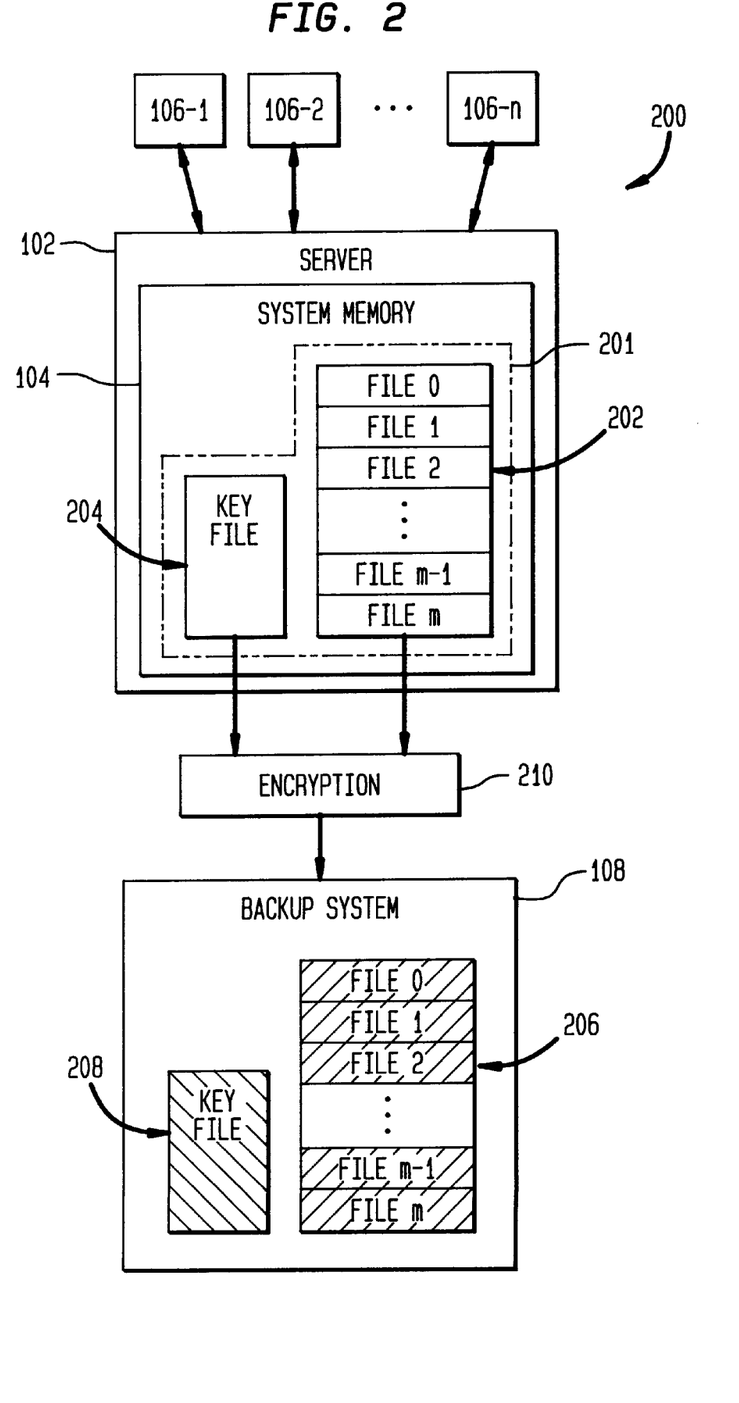
FIG. 2 illustrates a local area network using a preferred embodiment of the present invention.

FIG. 2 illustrates a computer system 200 using a preferred embodiment of the present invention. A number of terminals 106-1–106-n communicate with a central file server 102. The central file server 102 has a system memory 104. The system memory includes a file system 201 having a number of files 202 (e.g., file 0-file m) of electronic information and a key file 204 which stores encryption keys, discussed below. The backup system 108 receives and stores encrypted copies of the files 206 and may also receive an encrypted copy of the key file 208. As discussed below, it is preferable that the encrypted key file 208 be encrypted differently than the other files 206.

Between the server 102 and the backup system 108 is an encryption device 210. The encryption device may be software performed by a processor in the server 102 or backup system 108, a dedicated hardware device, such as an encryption chip, or other encryption device. The encryption device receives a file from the system memory 104. The encryption device 210 also obtains an encryption key. Preferably, the encryption key is randomly generated by, for example, software in the encryption device 210 or the operating system of the computer system 200. It is also preferable that the encryption key not be revealed to the user (or anyone else). Using the encryption key, the encryption device encrypts the file and provides the encrypted file 206 to the backup system 108. As discussed in more detail below, the encryption device 210 may also obtain a master key and the key file 204. Using the master key, the encryption device encrypts the key file and provides the encrypted key file 208 to the backup system 108.

Figure 3:
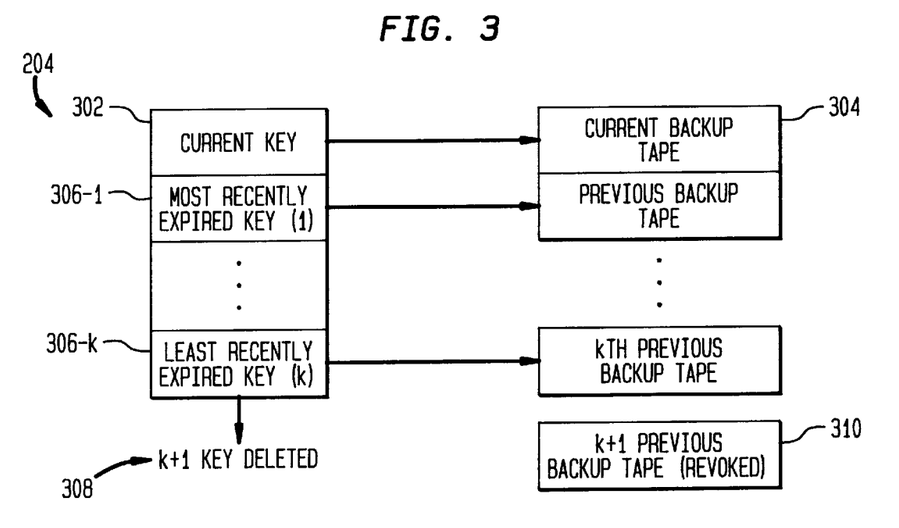
FIG. 3 illustrates the operation of a preferred embodiment of the present invention.

In a preferred embodiment of the present invention, the user can specify a collection of files that are to be encrypted during backup. Either all files or selected files may be encrypted during backup. FIG. 3 illustrates the operation of a preferred embodiment of the present invention for a single file on the file system 201. Each file on the file system 201, such as the file in FIG. 3, which is to be encrypted and stored on the backup system 108 has an encryption key associated with it in the key file 204. The current key 302 is stored in the key file 204. This current key is used to encrypt the file to be stored on the current backup tape 304. The encryption key has a life time specified by the user. In the embodiment illustrated in FIG. 3, the life time is set to zero. As a result, a new key is generated during every backup. When a key's life time is expired, a new current key is generated. When the newly generated current key encrypts the file for backup, the previous key used to encrypt the same file onto the previous backup tape expires. When a key 302 expires, the expired key is added to a list of expired keys 306 in the key file 304. The user may specify a maximum number of expired keys (i.e., k keys as seen in FIG. 3) which may be stored in the key file. When the maximum number of expired keys (i.e., k keys as in FIG. 3) is reached, the oldest expired key (i.e., the k+1 key) in the key file is "lost," e.g., erased, deleted, or removed to make room for the new key. Once the key is lost, data encrypted with this key (i.e., the version of the file on the k+1 backup tape 310) becomes inaccessible to everyone—including the file owner—and thus is revoked. A key may have a life time set to infinity. In this case, the key does not expire and the file backed up with this key is not revoked.

The above mechanism is very flexible. Several non-limiting examples are provided to illustrate the present invention. Suppose a user is preparing a document for which old and invalid versions are to be inaccessible to anyone. The user may set the key life for that document to be, for example, one month and instruct the system to store 12 expired keys for this document. This means that a new key is generated once a month and causing a year old key to be "lost". The result is that once a month, all backup copies of that file older than one year are revoked. The frequency of new key generation and old key deletion may be adjusted to be any suitable values. Of course, the user can decide to delete a file altogether by instructing the system to remove all keys (including the current key) for the file. In the case of a file system 210 crash, the most recent backup of the document can be restored from tape using the current key.

Institutions may wish to adopt backup revocation policies. For instance, to prevent old data from being obtained in lawsuits, an institution may decide to revoke all backup tapes that are more than three years old. This is done by instructing the inventive device to delete all keys that expired more than three years ago. This file revocation makes files from old backup tapes inaccessible to anyone, including the user (as if the files were erased) without ever mounting a single tape.

Encryption

Because backup files are stored for extended periods of time, it is desirable that the files be securely encrypted. It is preferable to encrypt the files using a block cipher having longer keys than are typically used. For example, one could apply triple DES twice to obtain a 224 bit key. Because there exists $2^{224}$ or about $2.7 \times 10^{67}$ possible combinations for a 223 bit key, it is particularly difficult to "crack".

The size of the key file 204 can be reduced by using one way permutations. A one way permutation is a permutation which is easy to compute, but significantly harder to reverse. Let f be a one way permutation. For example, given x, f(x) is easy to compute, but given f(x), x is difficult to compute (where "difficult" means it would take millions of years to compute x from f(x)). A key file may contain only the oldest accessible key. The next key may be obtained by performing the one way permutation on the oldest accessible key. The more recent keys can be obtained by repeatedly applying f to this key because this is easy to compute. Thus, after a first key k expires, the current key is f(k). After f(k) expires, the next current key is $f_2(k)$. However, only k is stored in the key file. When it is desired to "lose" k, it is replaced in the key file with f(k). Because given f(k), it is difficult to compute k, one may say that k has been "lost". For efficiency, it may be desirable to store both the oldest and most recent keys in the key file. Using this approach, only two keys may be stored per key file entry.

Key Management

An important component of the inventive method is key management. As seen in FIG. 2, encryption keys may be stored in a key file 204. The key file 204 is preferably protected so that only privileged processes may be allowed to read it and it is not revealed to the user or others. The key file preferably contains one record per each file that has been encrypted during backup. There are two types of entries in the key file record: file entries and directories. Appendix 1 is pseudocode for a single entry in the key file according to a preferred embodiment of the present invention.

The file entry fields of the key file records contain the file name, the number of expired keys that the system should store, the life time of a single key, and a key list. As seen in FIG. 3, the key list includes the current key 302 (as the first entry in the list) followed by the expired keys 306-1 to 306-k ordered chronologically. When a new key is generated, the keys in the list are shifted and the last (oldest) entry is "lost", i.e., deleted. The file or files encrypted with the now deleted key cannot be decrypted and therefore are inaccessible.

The directory entry fields specify the directory path for the backup file and indicate whether all files in the directory and subdirectories should be encrypted during backup. When the cont-flag (content flag) is turned on, the directory is scanned and entries for new files in the directory are added to the key file. The num-key (number of keys) and key-life (life time for the keys) fields for new file entries are set to the values taken from the corresponding fields in the directory entry. A directory entry should precede a file entry in order to specify the path to the file.

The key file 204 is stored on the file system 201. Without the keys stored in the key file, the stored, encrypted backup files 206 cannot be decrypted. If the file 201 system crashes, the key file 204 may be lost with other files 202. For this reason, the key file 204 should also be backed up as would any other important file on the computer system. However, the file 204 cannot be written to a backup tape "as is", e.g., unencrypted. If so, the key file and encryption keys stored therein remain available on the backup tapes for as long as the backup tape physically exists. As a result, the encryption keys are not "lost" and the corresponding encrypted backup files 206 may be accessed. Thus, a preferred embodiment of the present invention generates a master key during a backup. Referring to FIG. 2, the master key is used by the encryption device 210 to encrypt the key file 204 before the key file is backed up. The encrypted key file 208 is then stored on the backup tape. The master key itself is not written to the backup tape. Thus, to revoke encrypted, backed up information, both the encryption key used to encrypt the file 202 and the master key used to encrypt the key file 204 should be "lost". Because the master key is preferably lost during the next backup (as discussed below), the backed up file is typically revoked following the next backup after the encryption key for that file (such as a 12 month old expired key) is lost.

In case of a file system 201 crash, the key file 204 may be lost with other files 202. Thus, the master key is used to recover the backed up key file 208 from the backup tape. Without the master key, the encrypted key file 208 cannot be recovered and the encrypted backup tapes become inaccessible because the encryption keys are lost. For this reason, the master key should be handled with care. Methods for storing the master key are discussed in detail below.

To make sure that the key file is backed up to tape, the present invention treats it as any other file which is to be encrypted during backup. As seen in FIG. 2, the key file 204 is stored on the file system 102 for which it used. Further, the key file contains an entry which corresponds to the key file itself. The file name field in this entry contains the key file name and the key field contains the master key. Hence, the master key is actually stored in the key file and is used to encrypt the key file during backup. The master key is removed from the key file 204 prior to writing the encrypted key file to the backup tape. When the updated key file 204 is written back to the system memory 104, the new master key may be written along with it or it may be stored elsewhere, as discussed below. To make sure that a new master key is generated during every backup, the key-life field is preferably set to zero. Similarly, to make sure that only the current master key is stored in the key file 204, the num-keys field for the master key is preferably set to 1. This revokes the old copy of the master key file during every backup. Thus, in this preferred embodiment, the encrypted key file 208 is revoked every time the next backup is performed.

Observe that the master key should not be backed up in the clear on the backup system. If it is, the backed up key file on the tape may be accessible, the encrypted files on tapes using these keys are also accessible. Furthermore, wherever master keys are stored, preferably only the most recent key is accessible. This is because an old master key enables access to old tapes. Hence, any system which stores master keys preferably should "lose" all but the most recent one. Thus, master key management should be performed carefully. Two preferred master key management methods are described below.

In a first preferred method of managing master keys, at the end of each backup, the computer operator writes down (on paper or on a floppy disk) the current master key. He then destroys his copy of the previous master key.

Figure 4:
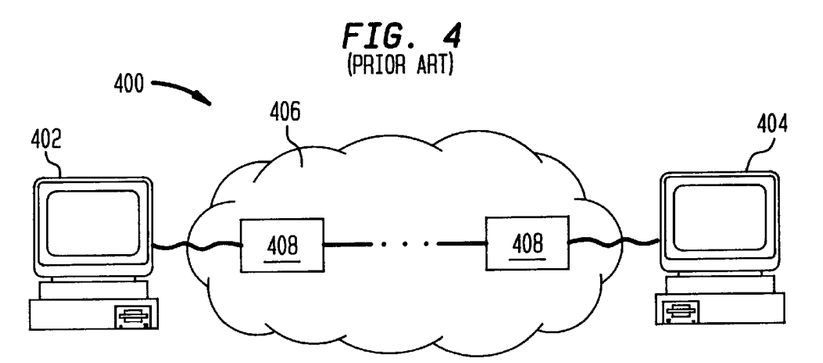
FIG. 4 illustrates an Internet network having a master key storage server according to a preferred embodiment of the present invention.

A second preferred method involves a network server, such as an Internet server, which is used for master key storage. FIG. 4 illustrates a simplified Internet network 400. As seen in FIG. 4, a number of terminals 402, 404 or "hosts" (which may be personal computers, network servers, or other devices) may communicate information over a network 406. The network 406 may include a number of interconnected routers 408, which connect the hosts. The routers 408 do not originate or terminate communicated data in an ordinary communication. Rather, the routers receive communicated data from one host and transmit data to another router or host.

In FIG. 4, assume host 402 is a computer system using the present invention and host 404 is an Internet server used for master key storage. Suppose the computer system 402 performs daily incremental backups. (An incremental backup is a backup of only a certain level of files which were modified since the last backup of that level.) The master key storage server 404 generates a public/private key pair on a daily basis. For example, the server 404 generates a public key which is published and known to all. Information encrypted using this public key, however, cannot be decrypted without using a private key known only to the server 404. The master key is stored in the following manner. The computer system 402 generates its master key. The computer system 402 then receives the server's 406 current public key. The computer system 402 encrypts the master key with the server's public key and writes the resulting encrypted master key to its backup tape. The computer system does not have an unencrypted copy of the master key. Because the master key is encrypted and the computer system cannot, by itself, access the encrypted master key, it may be written to the backup tape. Note that in this embodiment, the master key may only be accessed with the private key known only to the Internet server 404. After a predetermined time (such as one day, three days, one week, one month, etc., preferably depending on the frequency of the computer system's backups) the private key needed to decrypt the master key is "lost". This "loses" the master key because it can no longer be decrypted.

In case of a file system 201 crash, the computer system 402 can recover its master key in the following manner. A local computer operator first reads the encrypted master key written on the backup tape. The encrypted master key is sent to the storage-server 404. The storage-server 404 authenticates the identity of the sender. The authentication method may be simple, such as telephone confirmation or a personal identification number, or may be more sophisticated, such as a digital signature, Fiat-Shamir authentication scheme, or any other suitable method. After the sender is authenticated, the server 404 decrypts the encrypted master key using the private key known only to the server. The decrypted master key may be sent back to the computer operator. (The master key may be sent in the clear or could be exchanged using a well known key exchange, such as a Diffie-Hellman key exchange or an RSA key exchange.) The master key is used to restore the file system using the appropriate backup tape.

The same public/private key pair can be used by all computer systems in the world which use regular—in this example, daily—(incremental) backups. Because information encrypted using the public key can only be decrypted by the server's private key, no party can recover any other party's secret information encrypted with the public key, even having a third party's master key encrypted with the public key. Hence, the master key storage server provides the service of generating a public/private key pair on a regular basis.

The above description is similar to a standard key escrow system. One difference is that old master keys should be inaccessible, so the master key storage server should erase all but the most recent private key. Otherwise, old master keys can be recovered from old tapes. These master keys then enable anyone to read the contents of old tapes. Because the storage server is providing a commercial service it is in its best interest to be trustworthy and erase all old private keys. Thus, the key server preferably revokes old private keys on a regular basis (e.g., daily, weekly, monthly, etc.).

To increase the security and reliability of the scheme, one can use k out of l secret sharing techniques, such as disclosed by A. Shamir, "How to Share a Secret" CACM, vol. 22, November 1979 (pp. 612–13). The contents of this document are incorporated by reference. This means that a given site will employ l storage-servers and exactly k of them are used to recover the daily master key. Now a computer system's old master key cannot be recovered by an adversary even if k−1 of the storage servers are untrustworthy. Similarly, even if l-k storage servers crash and lose their current private key, a computer system can still recover its current master key. The parameters l and k can be selected to the computer system's needs.

For increased reliability, some computer systems may wish to be able to access a small number of old master keys. For instance, if there is a file system 201 crash and the most recent backup tape is (physically or electronically) lost, the previous backup tape may be used to restore files if the master key for that backup tape is still accessible. To accommodate this need, a storage server can offer k where, for example, k<10 types of public/private key pairs. For type 1, only the most recent private key is available. For type 2, the two most recent private keys are available, etc.

Backup and Restore Operations

Figure 5A:
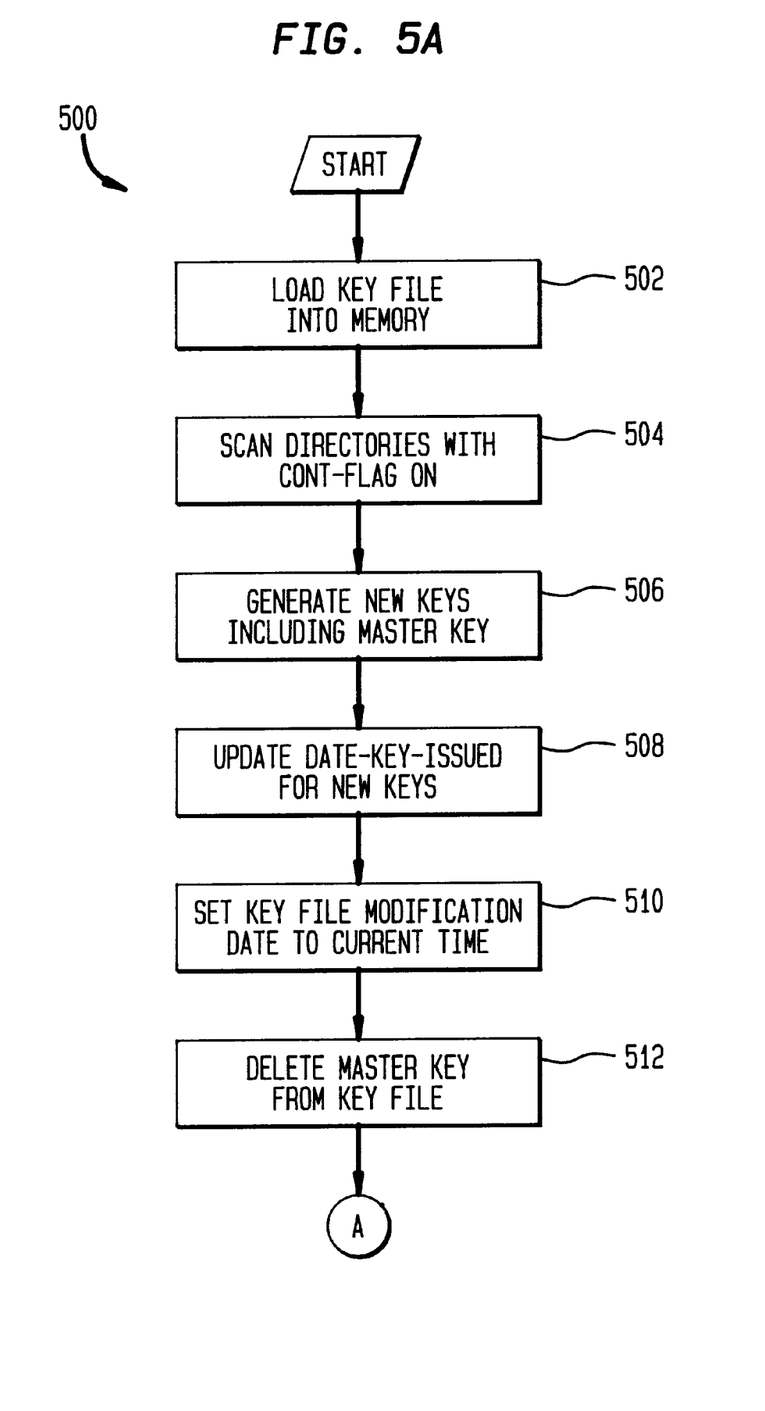
FIGS. 5A and 5B are a flow chart of a preferred backup operation according to a preferred embodiment of the present invention.
Figure 5B:
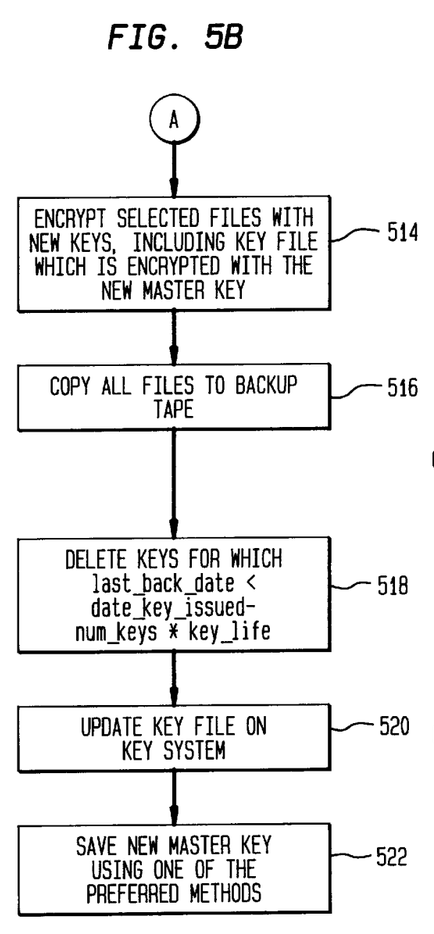

The backup and restore operations are described. FIGS. 5A and 5B are a flow chart 500 illustrating a preferred backup operation. Appendix 2 is pseudocode for a preferred method of the backup operation. As seen in FIG. 5A, when the backup process is initialized a copy of the entire key file is loaded into memory (step 502). Next, directories in the key file which have the cont-flag turned on are scanned (step 504) and the contents of these files are added to the key file. Next, new keys are generated for all files needing new keys, including a new master key (step 506). For example, a new key is generated for all files for which date_key issued+ key_life<current_date. Next, the date_key_issued field is updated for each new generated key (step 508). A touch_ key_file routine updates the last modification date of the key file (step 510). This guarantees that the key file is written to tape even during an incremental backup.

Before the files are encrypted, the master key is deleted from the copy of the key file loaded in memory (step 512). Next, the files selected for encryption are encrypted, including the key file which is encrypted using the master key (step 514). Next, each file is dumped to tape (step 516).

Entries for which last_back_date<date_key_issued- num_keys*key_life can be removed from the key file (step 518). The files encrypted with these removed keys can no longer be decrypted. Thus, the backup copies of the corresponding files are lost. Finally, the key file on the file system is updated (step 520) and the new master key may be stored, preferably using the methods described above (step 522).

Figure 6:
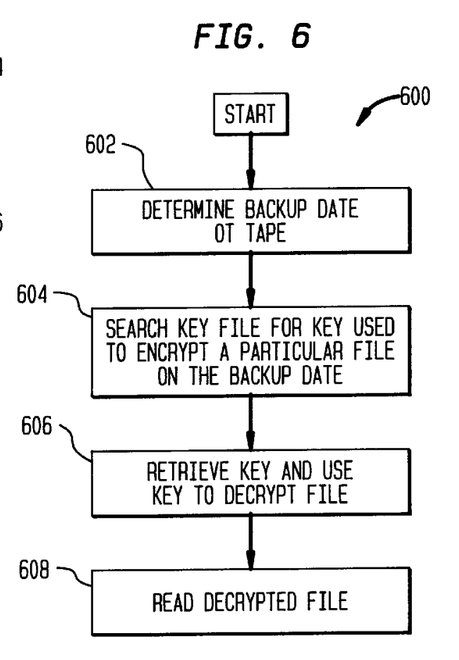
FIG. 6 is a flow chart of a preferred file restoration operation according to a preferred embodiment of the present invention.

FIG. 6 is a flow chart 600 illustrating a preferred method for restoring a file. Restoring a file is performed in the following manner. During restore, the key file 204 is used to find the appropriate key for each file to be restored. The system first reads the date written on the backup tape (step 602). This date is the date on which the backup was performed. For each file to be restored, the key file is searched for the key used to encrypt the file on the backup date (step 604). The system retrieves the key used to encrypt the file on the backup date and uses this key to decrypt the file (step 606). Next, the decrypted file is read from the tape (step 608).

In case of a file system crash, the backed up, encrypted key file 206 should be recovered. This is preferably done by creating a temporary key file containing a single entry. This entry contains the key file as its file name and the master key as the key. The operator can now use a restore command to recover and decrypt the most recently backed up version of the key file. A full restore of the file system is now possible.

The User Interface

Preferably, two utilities enable a user to interact with a system according to the present invention. The first utility, "make revokable" or mkrvcbl, enables a user to declare that a file or directory has the revocable-backup attribute. The second utility "revoke backup" or rvkbck, enables a user to revoke backup copies of files. These two utilities comprise a basic interface.

The make revocable command adds an entry for a particular file (or directory) to the key file. That is, the file for which this command is present will be backed up in encrypted form. The user can specify the key-life and num-keys parameters for this entry on the command line. The default values for these parameters are infinity for the key-life and one for num-keys. This means that there is a single key associated with the file throughout the life of the file. This enables the user to revoke all backup copies of the file when the file is completely removed from the system. Executing mkrvcbl dir-name adds the directory to the key file with the cont_flag turned on. During backup, all files in the directory and its subdirectories may be added to the key file. Preferably, only the owner of the file (or directory) is permitted to apply mkrvcbl to the file (or directory).

The revoke backup command is activated as rvkbck file-name [date]. Preferably, only the file owner is permitted to apply rvkbck to a file. The command removes keys that expired before date from the file's entry in the key file. If the date parameter is left blank, the entire file's record is removed from the key file. In doing so, the keys used to decrypt the file from the backup tapes are lost. As a result, the file can no longer be restored from the backup tapes. Recall, however, that the key file 204 itself is also backed up on tape. Hence, if the encrypted, backed up key list 208 is restored, the removed entry can still be found on the backup version of the key file. However, at the next backup the master key will change, revoking the old backed up version of the key file. Therefore, the entry is then permanently removed from the key file after the next backup operation. For example, in a system where an incremental backup takes place daily, the rvkbck file-name command will permanently remove the file within 24 hours of the time the command is issued.

The two utilities described above enable a user to manipulate the key file as desired. The key file 204 contains an entry for the files which have been encrypted during backup (and not been revoked). This could potentially make the key file large. Once every time period, e.g., once a year, the computer operator may wish to prune the key file by removing all entries which correspond to files which are no longer present on the file system. This is done using the prune-key file utility.

The command prune-key file date removes entries in the key file which correspond to files which no longer exist on the file system and whose last backup date is prior to 'date'. That is, files which now exist only in backup form, but the user does not want revoked. The utility writes the removed key file entries to a file called key file 'date'. This file, which lists the removed key file entries, is backed up to tape as a regular file (without encryption) and then removed from the file system. Because the removed key file entries are backed up in the clear, the decryption keys to restore these files are available. Consequently, the user can no longer revoke these files. This is done to purge the key file 204. That is, the key file 204 is relieved of old key file entries which correspond to files that are no longer on the file system, but which the user does not want revoked.

Conclusion

Described is a system enabling a user to remove permanently a file from a file system and all backup tapes. The present invention applies cryptography in a new way: cryptography is used to erase information rather than to protect it.

The system preferably requires no modification to existing computer file systems. The present invention may embed a new file attribute in the file header. This attribute indicates that the file is to be securely backed up. This way when the file is moved or copied, the new file will have the same attributes.

The above described embodiments of the invention are intended to be illustrative only. Numerous alternative embodiments may be devised by those skilled in the art without departing from the spirit and scope of the following claims.

We claim:

1. A method for preventing the reading of all backup copies of electronic information, the method comprising:

using an encryption key, encrypting only the electronic information being backed up;

storing the encrypted electronic information on a backup medium;

creating a key file;

storing the encryption key in the key file;

encrypting the key file with a master key;

backing up the encripted key file; and destroying any record of the encryption key.

2. The method of claim 1, further comprising the steps of of generating a new master key each time the encrypted key file is backed up and destroying any record of the most recent previous master key.

3. The method of claim 1, further comprising;
   a. generating a new encryption key each time the electronic information is backed up;
   b. encrypting the electronic information with the new encryption key;
   c. storing the new encryption key in the key file;
   d. saving a predetermined number of previously used encryption keys in the key file; and
   e. deleting from the key file encryption keys exceeding the predetermined number.

4. The method of claim 1, further comprising:
   a. a computer system storing the encrypted electronic information obtaining a public encryption key from a master key storage server; and
   b. using the public encryption key, encrypting the master key.

5. The method of claim 4, further comprising:
   a. transmitting the encrypted master key to the master key storage server; and
   b. using a private key, the master key storage server decrypting the encrypted master key; and
   c. the master key storage server transmitting the decrypted master key to the computer system.

6. The method of claim 5, wherein the master key storage server loses the private key after a predetermined time.

7. An apparatus for backing up electronic information on a computer system comprising:
   a. a system memory storing:
      (1) a file of electronic information; and
      (2) a key file configured to store encryption keys;
   b. an encryption means configured to:
      (1) receive and encrypt the file of electronic information using a first encryption key: and
      (2) receive and encrypt the key file using a master key; and
   c. a backup system configured to receive and store the encrypted file of electronic information and the key file, wherein said stored encrypted file of electronic inform ation and key file are rendered unreadable without access to said first encryption key and the master key.

8. The apparatus of claim 7, wherein the key file further comprises:
   a. a current encryption key used to encrypt the file onto a current back up;
   b. a predetermined number of previously used encryption keys used to encrypt the file on previous backups, wherein an encryption key which was used on one of the earlier backups is deleted when the total number of encryption keys in said key file exceeds the predetermined number.

9. The apparatus of claim 7, wherein the encryption keys, including the first encryption key, are not revealed.

10. A method for backing up electronic information stored on a computer system so that reading of all copies of the backed up information is prevented when the electronic information stored on the computer system is deleted, the method comprising:

generating a first encryption key;

encrypting said stored electronic information using the first encryption key;

backing up the encrypted electronic, information by making a copy of said encrypted electronic information on a backup storage medium;

generating a second encryption key when a second backup copy of said electronic information is made;

creating an encryption key file for storing said first and second encryption keys; and storing in said encryption key file a date associated with each encryption key upon which each of said first and second encryption keys will expire.

* * * * *